United States Patent
Mezer et al.

(10) Patent No.: US 8,422,891 B2
(45) Date of Patent: Apr. 16, 2013

(54) JITTER REDUCTION OF ELECTRICAL SIGNALS FROM LIMITING OPTICAL MODULES

(75) Inventors: Amir Mezer, Haifa (IL); Ehud Shoor, Haifa (IL)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 12/890,150

(22) Filed: Sep. 24, 2010

(65) Prior Publication Data

US 2012/0076508 A1    Mar. 29, 2012

(51) Int. Cl.
*H04B 10/06* (2006.01)
*H04B 10/12* (2006.01)

(52) U.S. Cl.
USPC ............................ 398/209; 398/202; 398/208

(58) Field of Classification Search .................. 398/202, 398/208, 209, 210, 206, 213
See application file for complete search history.

(56) References Cited

U.S. PATENT DOCUMENTS

| | | | |
|---|---|---|---|
| 3,727,131 A * | 4/1973 | Puckette, IV | 324/76.29 |
| 2003/0170022 A1 | 9/2003 | Josef Moeller | |
| 2008/0069282 A1 | 3/2008 | Kuwata | |
| 2008/0080608 A1 * | 4/2008 | Mobin et al. | 375/233 |
| 2008/0279566 A1 | 11/2008 | Miller et al. | |
| 2009/0168940 A1 * | 7/2009 | Aziz et al. | 375/371 |

OTHER PUBLICATIONS

PCT Search Report, PCT/US2011/053162, Mailed Mar. 15, 2012, Applicant Intel Corporation, 9 pages.

* cited by examiner

*Primary Examiner* — Kenneth N Vanderpuye
*Assistant Examiner* — Daniel Dobson
(74) *Attorney, Agent, or Firm* — Blakely, Sokoloff, Taylor & Zafman LLP (57) ABSTRACT

Jitter reduction of electrical signals from limiting optical modules is described. In one example, a process includes receiving an amplitude limited electrical signal that has been converted from an optical signal, applying a filter to the received electrical signal, measuring an indication of jitter of the filtered signal, and selecting parameters of the linear filter based on the measured indication.

17 Claims, 6 Drawing Sheets

JITTER REDUCTION OF ELECTRICAL SIGNALS FROM LIMITING OPTICAL MODULES

FIELD

The present description relates to optical receivers in optical communications systems and, in particular, for reducing the overall jitter at the output of a limiting optical receiver.

BACKGROUND

A desire to transmit more data in less time has resulted in an increased interest in using optical fiber to transmit data instead of copper wires. Optical fiber can carry more data than a similarly sized electrical cable and is less susceptible to electrical and magnetic interference. While optical fiber is commonly used for long distance telephone and Internet backbone communications, it has not found significant use over shorter distances.

For many shorter distance optical connections, cost becomes a more significant factor. With reductions in the cost of the transmitting and receiving equipment on both sides of an optical fiber, jitter becomes more difficult to manage. Jitter is a variation in the phase, or timing of a series of signals that is caused by interference, cross-talk, inter-symbol interference, limitations in transmitters and receivers and other aspects of the connection. While jitter can be present in almost any data connection whether electrical, optical, or radio, as the frequency of the data increases, jitter becomes more important. Jitter is used to describe a wide variety of different effects on a data stream. Many of these relate to changes in phase or timing.

In an optical fiber transmission system, the data is driven by an electrical transmitter which modulates the incoming data stream which creates an input to the optical transmitter. The optical transmitter converts the electrical signal into an optical signal which is carried by the optical fiber and is typically recovered by a photo detector. The photo detector generates an electrical signal that is high or low depending on whether the optical signal is on or off. This electrical signal is then carried to an electrical receiver and sampled at some frequency that corresponds to the timing of the transmitted data. Without jitter, if the timing of the received signal and the sampler match, then the sampler will observe either a high or a low. These highs and low correspond to zeroes and ones of the digital signal. If there is jitter in the signal then the cycles of the received signal may not always align with the timing of the sampler and the sampler may recover the wrong value.

In a typical optical transmission system, the optical fiber is coupled at the receive end to an optical module with a photo detector. In many cases, the optical module includes a limiter to limit the total amplitude of the converted electrical signal from the photo detector and related amplifiers. The signal at the limiter's output typically has high jitter most of which is Data Dependent Jitter (DDJ) caused in part by Inter-Symbol Interference in the optical fiber.

DETAILED DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1A:
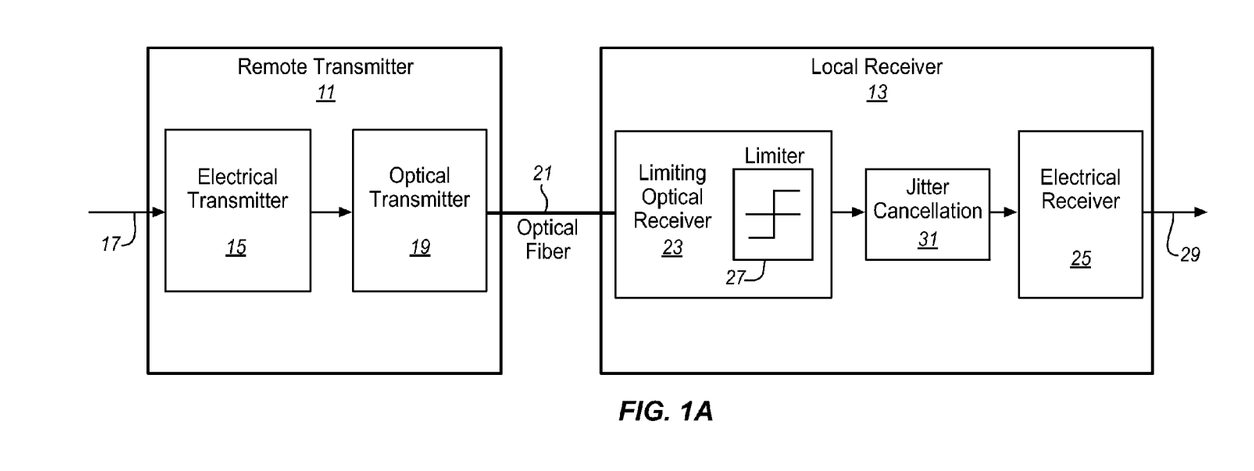
FIG. 1A is a block diagram of an optical communications system with an optical transmitter and an optical receiver according to an embodiment of the invention.

In one embodiment, by canceling the DDJ (Data Dependent Jitter) at the receiver's output, the total jitter is greatly reduced. A "jitter cancellation" mechanism can be implemented as a linear filter. The linear filter adds "inverse distortion" which introduces "counter jitter" to that which the signal has undergone. (See FIG. 1 in section 3 below). In one embodiment, a bank of Continuous-Time Linear Filters (CTLF) is used. In other embodiments, a non-linear filter may be used.

In one embodiment, a search algorithm scans the whole bank, provides a metric for each CTLF configuration, and chooses the one CTLF configuration that provides the best jitter cancellation for the current operating scenario. Any of a variety of different metrics can be used. In one example, the metric is a monotonically increasing function of the eye opening, i.e. the function monotonically increases with the amount of jitter cancellation de facto.

After passing through the limiter, the signal is no longer linear and therefore conventional equalization techniques are much less effective. One embodiment of the invention takes advantage of the information still held in the zero-crossings of the signal that is output by the limiter. Based on this signal, the anti jitter mechanism creates "counter DDJ."

In some embodiments, the jitter cancellation mechanism may be placed at the electrical receiver and in other embodiments at the electrical transmitter. Yet additional implementations may integrate the jitter cancellation mechanism into the optical circuitry. In one embodiment, the anti-jitter mechanism is implemented at the transmit side, before the signal is transmitted through the optical fiber. For such an embodiment, the jitter metric may be computed at the receiver output. The metric may be sent through a back channel to the transmit side, or the selection of the jitter cancellation settings may be communicated through a back-channel to the transmit side.

The anti-jitter mechanism can use multiple "counter DDJ" configurations of continuous time linear filters (CTLF). These may be a part of an optical receiver or another component. An auxiliary circuit which compares different CTLF configurations and computes a jitter metric or cost function (e.g. a maximum eye opening) for each CTLF configuration can be used to select the best configuration. The selected CTLF configuration may be adjusted for different optical configurations and equipment variations, e.g. different optical modules, fiber types or lengths.

FIG. 1A shows an optical communications system with a transmitter 11 and a receiver 13. The transmitter has an electrical side 15 with a port 17 to connect to a source of data. The transmitter configures the data from the source and provides it to an optical transmitter 19. The optical transmitter modulates the data on to an optical fiber 21 using a semiconductor laser, for example. The optical signal propagates through the optical fiber into the local receiver 13. The receiver includes an optical receiver 23 coupled to the optical fiber and an electrical receiver 25.

The optical receiver includes a photo detector to receive the optical signal from the optical fiber and convert it into an electrical signal. In the case of a limiting optical receiver, as shown, the optical receiver also includes a limiter 27 to regulate the amplitude of the electrical signal produced by the limiting optical receiver.

The optical signal after having been converted to an electrical signal is then provided to the electrical receiver 25. The electrical receiver converts, samples, and modulates the electrical signal into a suitable form for downstream equipment and is coupled at an electrical output 29 to the downstream equipment, such as a network interface, a router, a peripheral device, or a semiconductor chip. In one embodiment of the invention, the local receiver 13 also includes a jitter cancellation mechanism 31 coupled to the output of limited optical receiver to cancel jitter from the signal produced by the limiting optical receiver.

In a typical system, the optical receiver 23 and the electrical receiver 25 are made from separate chips or dies mounted to a single system board and connected with a wire or copper trace. Although the two chips may be combined in future systems. The jitter cancellation mechanism 31 may be a separate chip between the two or it may be incorporated into either the optical or the electrical receiver. Alternatively, portions of the jitter cancellation mechanism can be incorporated into different dies.

In many real systems, the signal at the output of the limiter has a high total jitter which is composed mainly of data dependent jitter (DDJ). The DDJ is typically caused by a high inter-symbol interference (ISI) within the optical fiber, the optical transmitter, and the optical receiver.

The high DDJ and ISI interfere with the accuracy of the receiver. Conventionally, an equalizer is used to compensate for ISI by reversing, at least in part, the overall distortion of the transmission path from the optical transmitter, through the optical fiber, to the optical receiver including effects of the ISI in the transmission paths. However, a typical equalizer relies on amplitude information in a received signal. When an optical limiter 27 is used, the equalizer is greatly limited in its ability to compensate for propagation effects within the optical fiber since the limiter has eliminated the information on the signal amplitude.

Because the limiter has a non-linear operation of cutting or limiting the maximum amplitude of the electrical signal produced by the optical receiver, in a limiting optical receiver, the jitter cannot be compensated by an equalizer. To reduce the total jitter at the limiter, for example the quality of the transmitter can be improved, the rate of data carried by the fiber can be reduced, and the transmit power can be increased. This however increases the cost and complexity of the communications system and reduces its total data rate.

FIG. 1A shows a system using a jitter cancellation mechanism. The jitter cancellation mechanism can include any of a variety of jitter cancellers. In one example, the jitter canceller is a continuous time linear filter. Possible implementations of the linear filter include continuous-time linear filters (analog filters), symbol-spaced analog filters and fractionally-spaced analog filters. In some embodiments, a non-linear filter may be used. The filters may be implemented using analog components, digital components, or as hybrid systems.

Figure 1B:
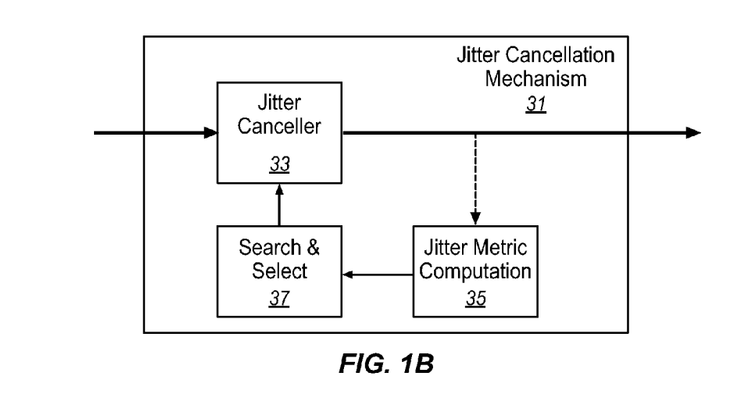
FIG. 1B is a block diagram the jitter cancellation mechanism of the optical receiver of FIG. 1A.

As shown in FIG. 1B, the jitter canceller 33 is coupled to a jitter metric computer 35 and to a search and select circuit 37. The jitter metric computer detects the signals on the output of the jitter canceller, which may be in the form of a linear or non-linear filter 33, establishes a metric on that signal, and supplies the result to the search and select circuit 37. The search and select circuit selects parameters for the linear filter 33 to apply to the signal. This creates a feedback loop from the output of the linear filter to the modifications by the search and select circuit so that the jitter cancellation mechanism can improve filter settings to enhance the quality of the signal output from the linear filter.

Figure 3:
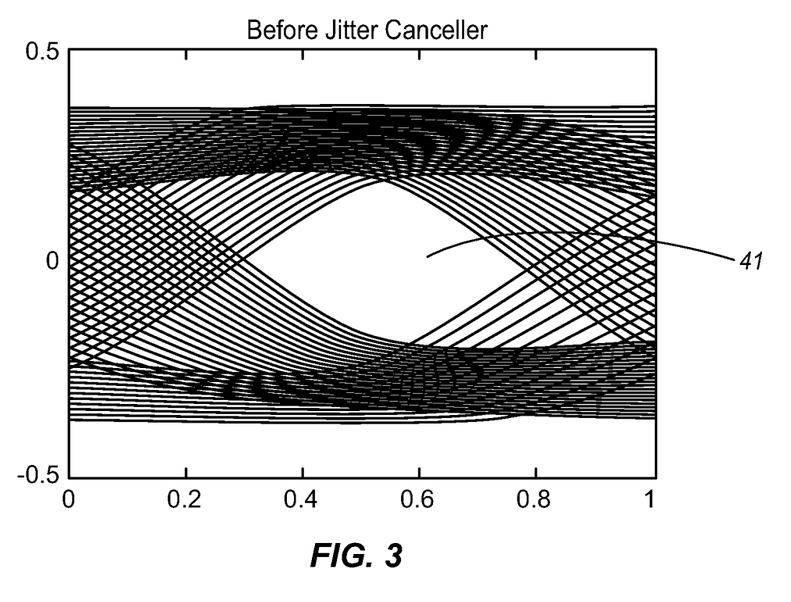
FIG. 3 is an eye diagram of an electrical signal from an optical receiver.
Figure 4:
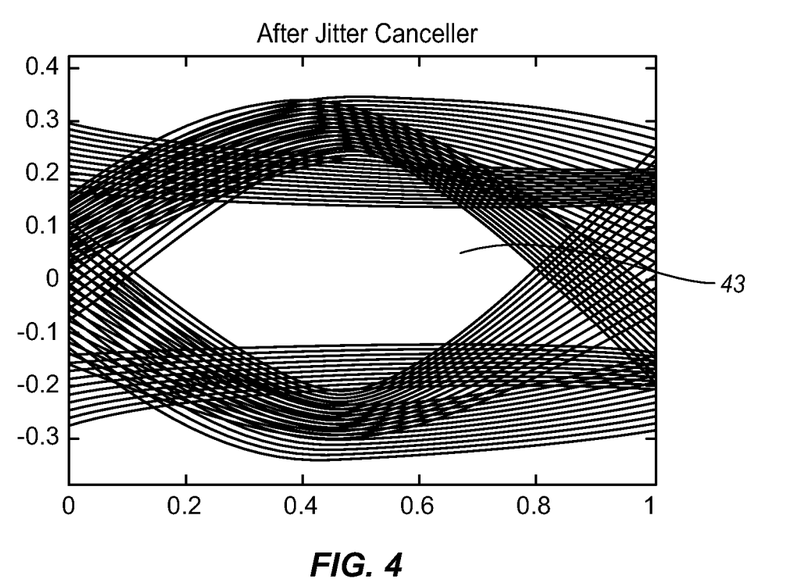
FIG. 4 is an eye diagram of an electrical signal from an optical receiver with jitter cancellation according to an embodiment of the present invention.

The output of the linear filter, as mentioned above, is supplied to the rest of the electrical receiver 13. The jitter metric computation can be performed in any of a variety of different ways. In one example, a waveform is analyzed for its zero crossings. In another example, an eye diagram is analyzed to optimize or increase the size of the eye of the eye diagram. In this context, the eye diagram, as shown in FIG. 3, is a graph of the samples of the output signal of the linear filter over time in which the data rate is used to trigger the horizontal axis. The eye diagram provides information about a variety of different measures of the signal distortion. The inter-symbol interference appears as a closure of the eye 41 of the eye diagram. Comparing FIG. 3 and FIG. 4, the eye 41 of FIG. 3 is narrower than the eye 43 of FIG. 4. The jitter metric computation can analyze the eye width as well as the eye height and provide a result to the search and select circuit 37. The jitter metric may include the eye width at a certain eye height or the eye height at a certain horizontal offset from the nominal sampling point.

The search and select circuit can operate to modify parameters of the jitter canceller. After each modification, the result from the jitter metric computer can be compared to the results before the modification to determine whether the modification should be kept or the jitter canceller should be returned to the previous configuration. The particular modifications performed by the search and select circuit will depend upon the nature of the linear filter. A variety of different search methods may be used depending on the particular application.

In one example, a typical average initial setting is used and the search and select circuit will vary parameters in two directions from the initial settings to determine a first best direction. Upon determining a direction, the search and select circuit will continue in that direction until the best results are obtained. In another example, all possible settings are tried and the best setting is selected. In another example, a set of settings are selected at stepped intervals. Each one is tried to predict the general location of the best settings. This can be used as a coarse tuning step. After selecting a best coarse tuning position, the neighboring parameter settings near the selected best coarse tuning position are then tried to select a best fine tuning parameter setting.

Figure 1C:
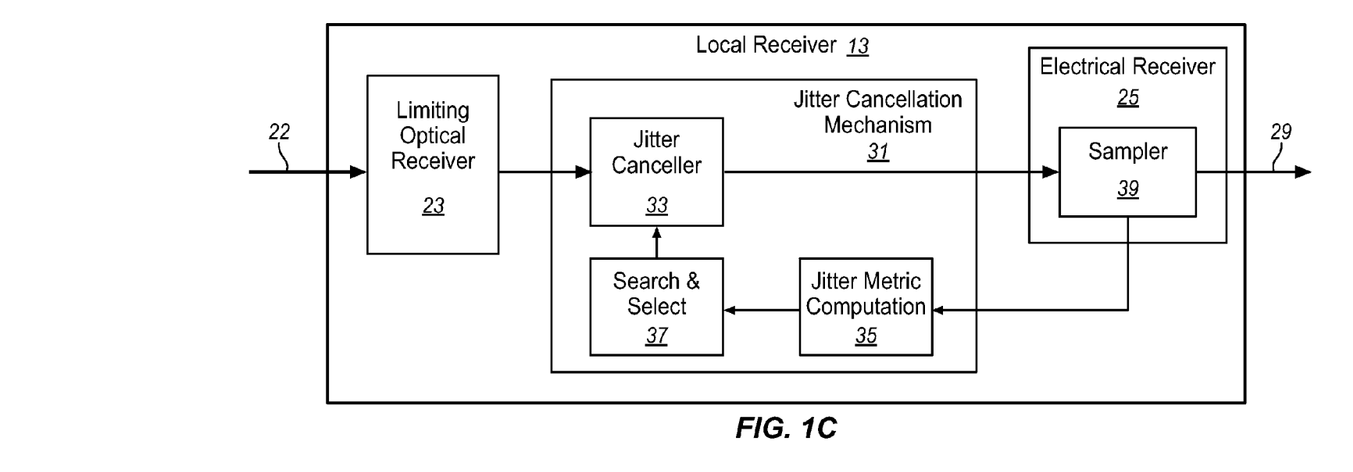
FIG. 1C is a block diagram of a variation of the jitter cancellation mechanism of FIG. 1A.

FIG. 1C shows a modification of the jitter cancellation mechanism of FIG. 1B. In this example, a sampler 39 of the electrical receiver 25 is shown. A typical function of an electrical receiver is to modulate the digital data for the output of the receiver. A sampler is typically used in an electrical receiver for that purpose. In the example of FIG. 1C, the filtered signal from the jitter cancellation mechanism is supplied to the electrical receiver for sampling, among other processes. The signal is measured by the jitter metric computation unit 35 at the sampler 39. The sampler is accordingly coupled directly into the jitter cancellation mechanism.

As with FIGS. 1A and 1B, the jitter cancellation mechanism 31 may be a part of the optical receiver, the electrical receiver, a separate component or its parts may be distributed. By measuring the filtered signal at the sampler all of the effects of the path from the remote transmitter to the sampler can be accounted for. This may result in higher accuracy for the filter parameters selected for the jitter canceller.

Figure 2:
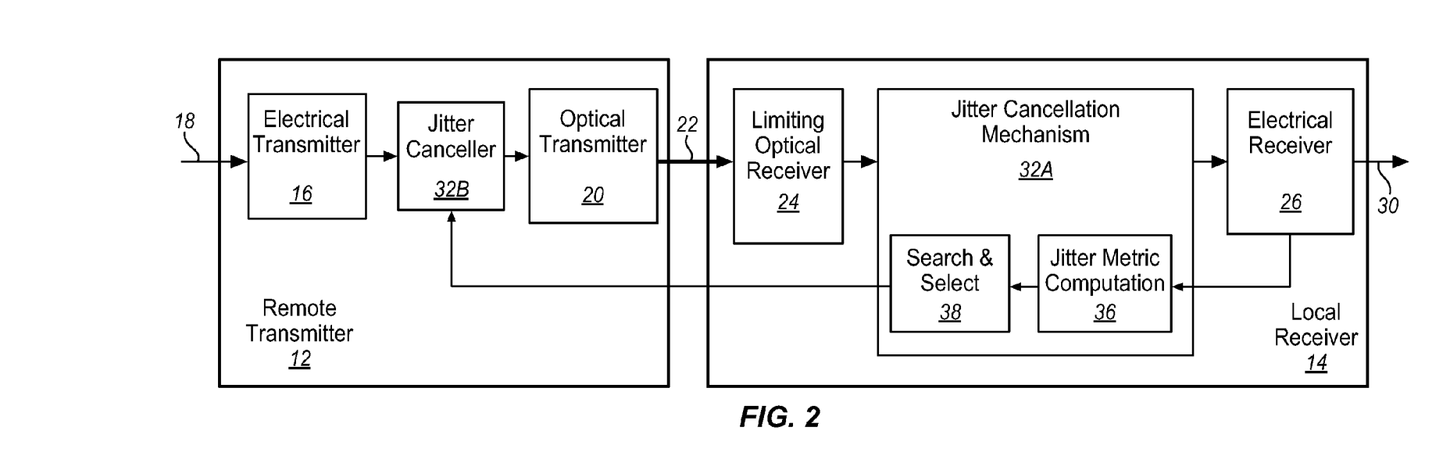
FIG. 2 is a block diagram of an alternative jitter cancellation mechanism according to an embodiment of the present invention.

FIG. 2 shows an alternative arrangement of an optical communications system with a transmitter 12 and a receiver 14. This system is similar to that of FIG. 1A except for the configuration of the jitter cancellation system. In FIG. 2, the transmitter has an electrical side 16 with a port 18 to connect to a source of data. The transmitter configures the data from the source and provides it to an optical transmitter 20. The optical transmitter modulates the data on to an optical fiber 22. The optical signal propagates through the optical fiber into the local receiver 14, that includes an optical receiver 24 coupled to the optical fiber and an electrical receiver 26. As in the case of FIG. 1A, the optical receiver also includes a limiter to regulate the amplitude of the electrical signal produced by the limiting optical receiver 24.

The optical signal after having been converted to an electrical signal is provided to the electrical receiver 26. The electrical receiver converts and modulates the electrical signal into a suitable form for downstream equipment and is coupled at an electrical output 30 to the downstream equipment.

In contrast to FIG. 1A, the jitter cancellation mechanism has two parts. The first part 32A is coupled to the output of the limiter. The second part 32B, including the jitter canceller is coupled to the input of the optical transmitter. The second part is shown as being a separate part but it may be a part of the electrical transmitter 16, however, it may alternatively be incorporated into the optical transmitter 20. Any two or all three components may also be combined to a one or two parts which include the jitter canceller. Additional parts may also be added to the system, depending on the embodiment.

In FIG. 2, a jitter metric computer 36 is coupled to the electrical receiver, for example at the sampling point as in FIG. 1C or at any other part. The jitter metric may also be coupled to the output of the limiting optical receiver. The jitter metric computer measures the quality of the signal and this result is coupled to a search and select circuit 38. These components act as described above in the context of FIG. 1B. The search and select circuit is coupled to the jitter canceller 32B through a back channel. The search and select circuit 38 sends selected filter parameters to a linear filter or another device of the jitter canceller 32B through the back channel to apply to the signal. The back channel can be a return frequency on the optical fiber 22 or through a separate connection as shown.

Figure 5:
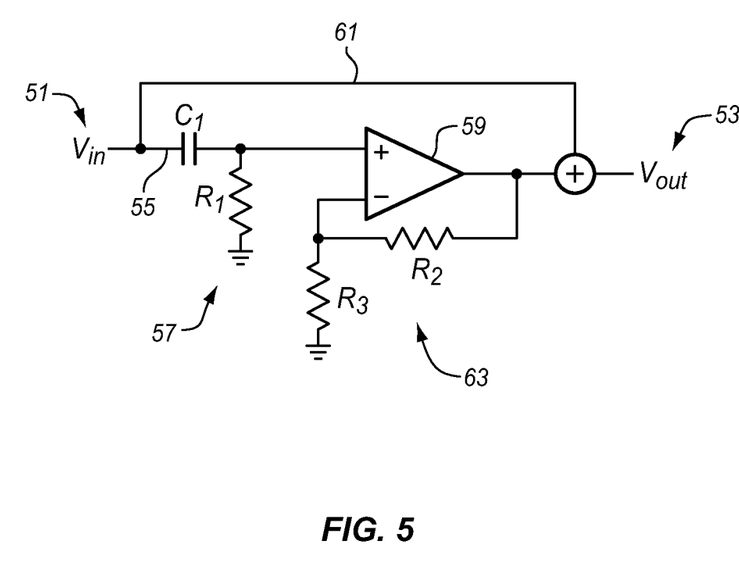
FIG. 5 is diagram of a filter circuit of the jitter cancellation mechanism of FIG. 1B according to an embodiment of the present invention.

FIG. 5 shows an example of one possible linear filter that may be used as a jitter canceller. The filter receives the converted optical input at an input 51 and produces a filtered electrical signal at its output 53. A first branch of the input 55 is applied to an RC network 57 and to a comparator from the output RC network 59. The output at the comparator is added to a second branch of the input 61 to obtain the output signal. The RC circuit is applied to one terminal of the comparator 59. A second input to the comparator is taken from the output of the comparator through a resistor network 63. By adjusting the values of the resistors and capacitors in this filter, the zero crossing position of the filter can be moved in time.

The operation of this particular filter can be characterized as follows, however a wide range of other jitter cancellers can be used instead as explained above:

$$H(f) = ((1 + R_2/R_3)/(1 + \frac{1}{2}\pi f R_1 C_1)) + 1$$

In one example, jitter is interpreted as the time position of the received signal's amplitude zero-crossings. If a signal has passed through a system where the bit-period or symbol-period has become slower or wider in time, then the zero-crossings become farther apart than a previous nominal bit-period or symbol-period. The jitter cancellation filter function introduces a counter-effect that causes the signal bit-period to become narrower in time so that the zero-crossings become closer and vice-versa.

As is clear from the filter function, the filter operation depends on the values of the various circuit components (R, C and possibly L in some embodiments) The filter may be active or passive. In one example, the linear filter is constructed with several different resistors and capacitors that can be inserted into or removed from the circuit using switches. To adjust the parameters of the filter, the search and select circuit can operate the switches that control which resistors and capacitors are connected to the filter. This allows a single filter with a plurality of selectable values for resistance, or capacitance, or both, to be adjusted to improve its effectiveness for reducing DDJ.

As mentioned above, the values of the capacitor and the resistors can be changed in order to change the frequency response of the filter in terms of zeros and poles. A benefit of the search and select circuit is that high accuracy is not required in the resistors and capacitors. If enough components are available, then the search and select circuit can find an optimal configuration, regardless of the actual values of the particular components that are eventually selected.

As an alternative, a plurality of different filter circuits may be provided in the jitter canceller. The search and select circuit instead of selecting between different or different combinations of passive circuit components can then choose between different filter circuits. The different filter circuits may also include selectable components. As a further alternative, different types of filters may be included in the jitter canceller system for the select circuit to choose between. The particular jitter cancellers and their method of operation can be modified from those shown and described to suit any particular application.

In other systems, it has been known to treat the remote transmitter and the local receiver as separate components and to treat the optical path as a delay buffer that cannot be affected. In some embodiments of the present invention, information in the zero crossings of the electrical signal is used to cancel jitter that arises, at least in part, in the signal's optical path. The location of the jitter canceller can be modified to suit different circumstances. As described above, a filter may be place within the electrical receiver, within the optical receiver, within the electrical transmitter just before the optical port or within the optical transmitter just before the semiconductor laser. As mentioned above, the jitter canceller can also be a discrete component at any of these positions.

If a feedback or adjustment system is used in the jitter cancellation mechanism, the electrical signal can be measured anywhere along its path after the output of the limiter. As described above, the sampler of the electrical receiver is a particularly good location to measure the signal, however, good results may be obtained by measuring the signal at other locations.

In contrast to previous equalization methods, the present invention allows jitter, especially DDJ to be canceled. The jitter canceller counter distortion which can allow zero crossings of the limited signal to be controlled. With a linear filter, adjusting the poles or positions of the zeroes of the filter, allows the jitter in the signal to be countered. With a nonlinear filter a controlled distortion can be created to counter that of the propagation path, using only zero crossing information from the signal.

Figure 6:
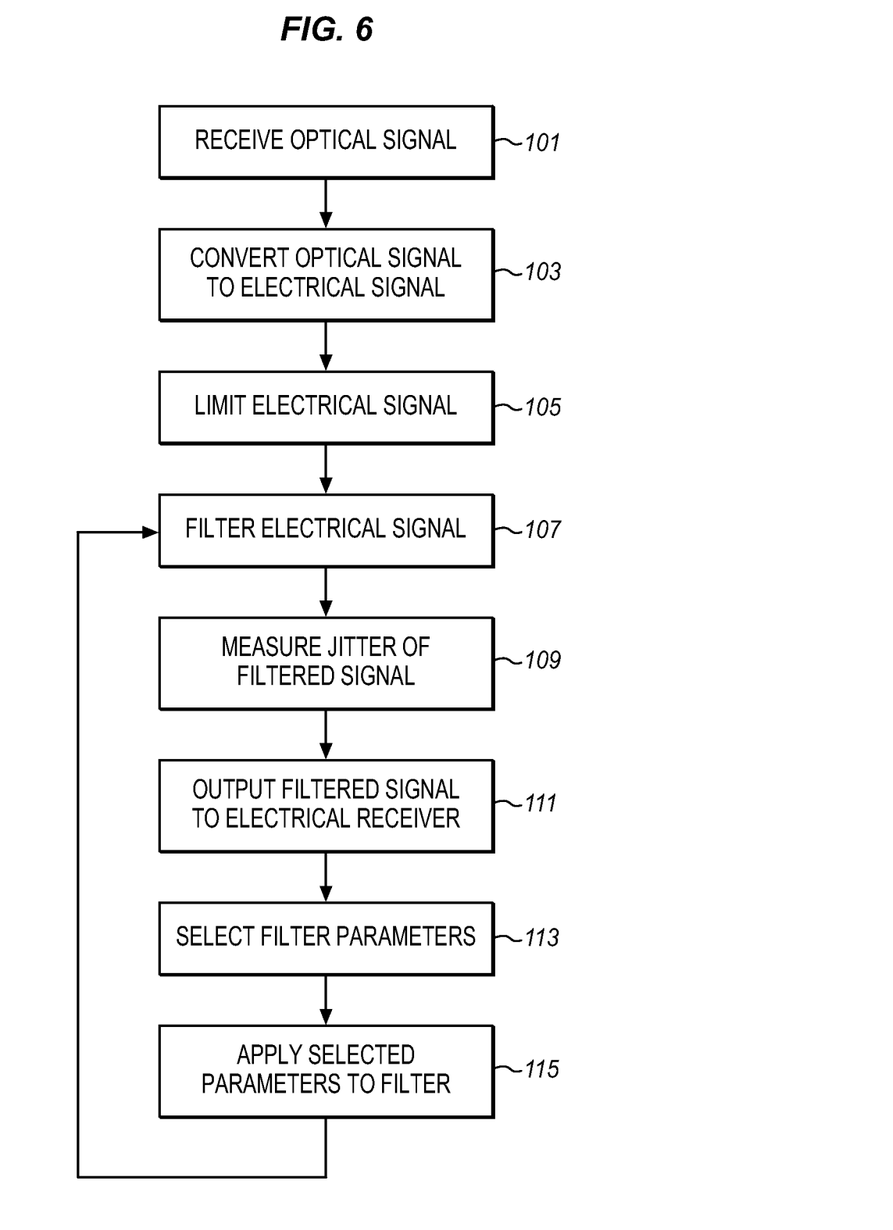
FIG. 6 is process flow diagram of canceling jitter according to an embodiment of the present invention.

FIG. 6 shows the operation of embodiments of the invention from the perspective of a sequence of operations. These operations may be performed in the hardware described above, other hardware, or in software. The operations shown in FIG. 6 begin at the optical input into the optical receiver. At block 101, the optical signal is received from the optical fiber and, at block 103, it is converted to an electrical signal. The electrical signal is then applied to a limiter at block 105. In the example hardware configuration of FIG. 1A, these operations are performed in a conventional optical receiver. The limited electrical signal then exits the optical receiver and is passed to an electrical receiver. However, this particular arrangement and separation of components is not necessary. The two receivers may be combined or different functions may be performed on different components. There may also be additional operations performed by the two receivers or by other components, not shown.

At block 107, the limited electrical signal is applied to a jitter canceller. As explained above, this serves to cancel jitter in the signal that arose due to propagation through the fiber and secondary and higher effects of the transmitter and receiver. The primary contributor to the jitter is ISI and the jitter is mostly composed of DDJ, however, embodiments of the invention may be used to cancel or attenuate other types of jitter and other undesired characteristics of the signal as well. While the filtering is shown as being performed after the limiting, it may be performed in the remote signal transmitter, as mentioned above. The electrical signal may be pre-filtered before it is converted to an optical format and sent through the optical fiber.

At block 109, the jitter in the filtered signal is measured. While jitter has been discussed in detail, other signal characteristics may also be measured at this time. At block 111, the filtered signal is output to the rest of the electrical receiver. In other words, the received data is passed on from the optical interface to the downstream components to which the data is addressed, directed, or intended.

At block 113, a set of filter parameters are selected for the jitter canceller using the measured jitter and any other measured parameters, depending on the particular embodiment. The selected filter parameters may be the same ones currently in use or different ones based on any of a variety of different selection procedures. At block 115, the selected parameters are applied to the jitter canceller and then the operations return to block 107. The cycle of filtering, measuring and adjusting may be repeated as long as the system operates, upon initial setup, or at intervals.

While the operations are shown as distinct blocks, the operations may all run continuously. Accordingly, while the jitter is measured at block 109, optical signals are being received at block 101, and filtered signals are being output at block 113. These operations can occur simultaneously. The measure, select, and apply operations may be performed continuously or at intervals depending upon the stability of the jitter effects in the received signal.

The embodiments described above provide substantially enhanced margins in systems with limiting optical modules. This directly allows for significant power reductions, cost reductions, and performance enhancements in the designs of optical receivers.

In addition, using a jitter cancellation mechanism allows for ultra-low power (<10 mW for 10G applications and lower in the future) at the receiver for achieving significant performance enhancements. The jitter canceller in combination with a search and select circuit significantly increases the eye opening. This has been proven in the lab using real circuits. Decreasing the jitter profile allows the receiver to smoothly operate under worst-case conditions with a large margin. In addition, the search and select circuit which provides an adaptive jitter cancellation mechanism in the receiver or in the transmitter, allows the jitter cancellation mechanism system to be adjusted according to any reasonable jitter profile encountered in the field. Precise calibration, precision circuitry, and a precise knowledge of circumstances at a particular install location are unnecessary. In addition, the system can adjust to changing conditions.

Figure 7:
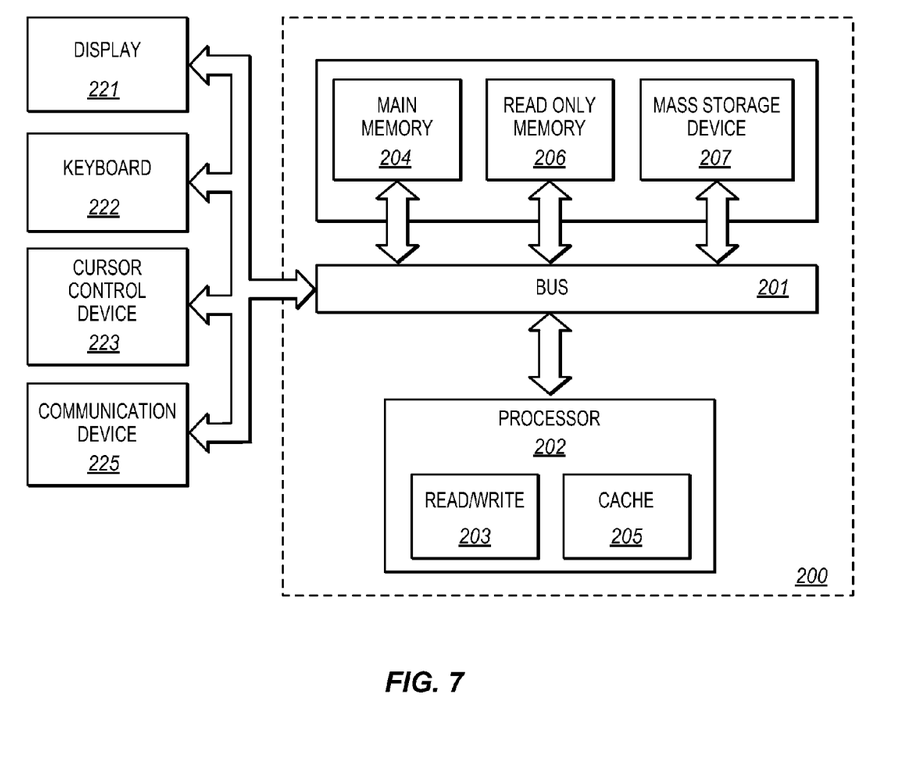
FIG. 7 is a block diagram of a computer system incorporating features of the invention.

FIG. 7 shows a computer system 200 incorporating features of FIGS. 1, 2, and 5 above. The computer system 200 represents an example of a system upon which features of the present invention may be implemented. Other electronic devices with discrete or embedded processors including media recorders, media players, tablets, telephones, personal mobile devices, game consoles, set-top boxes and other devices may take a similar form. This hardware configuration is shown as an example only and a variety of other configurations may be used instead.

The computer system 200 includes a bus or other communication conduit 201 for communicating information, and a processing engine such as a microprocessor, controller, or DSP (digital signal processor) 202 coupled with the bus 201 for processing information. Any one or more of the connections to the bus 201 may be optical connections using optical receivers and transmitters with jitter cancellation as described above. The processor 202 includes a read/write system 203 or memory controller coupled to a cache memory 205 such as an SRAM memory array, although other types of memory may be used.

The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor. The main memory may be implemented as a separate device as shown or integrated with the processor in a single chip.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions. The NVRAM and mass memory may also be combined or incorporated into the processor as a single chip.

The computer system can also be coupled via the bus to a display device or monitor 221, such as a Liquid Crystal Display (LCD), for displaying information to a user. In addition to video, graphical and textual indications of installation status, operations status and other information may be presented to the user on the display device. Typically, an alphanumeric input device 222, such as a keyboard with alphanumeric, function and other keys, or a remote control may be coupled to the bus for communicating information and command selections to the processor. A cursor control input device 223, such as a mouse, a trackball, a touch screen interface, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Further or alternative communication interfaces may be provided for other types of buses, such as USB (Universal Serial Bus), Firewire (i.Link or IEEE1394), Light Peak, or various wireless interfaces.

A lesser or more equipped computer system than the example described above may be preferred for certain implementations. Therefore, the configuration of the exemplary computer system 200 will vary from implementation to implementation depending upon numerous factors, such as price constraints, performance requirements, technological improvements, or other circumstances. The particular nature of any attached devices may be adapted to the intended use of the device. Any one or more of the devices, buses, or interconnects may be eliminated from this system and others may be added.

In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "an example," "one embodiment," or "an embodiment" means that a particular feature, structure, or characteristic described in connection with the embodiment is included in at least one embodiment of the present invention. Thus, appearances of such phrases in this specification do not necessarily all refer to the same embodiment. Furthermore, the particular features, structures, or characteristics may be combined in any suitable manner in one or more embodiments.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
    a limiting optical receiver to convert an optical signal to an electrical signal and to limit the amplitude of the electrical signal;
    an electrical receiver coupled to the optical receiver to receive the electrical signal, sample the received electrical signal and provide the sampled signal to downstream components;
    a jitter analyzer coupled to the received electrical signal before it is sampled to measure an indication of jitter in the received electrical signal;
    a jitter canceller to cancel jitter before the electrical signal is sampled based on the zero crossings of the received signal wherein the jitter canceller is a filter; and
    a selection circuit coupled to the jitter analyzer and the jitter canceller to select a plurality of different filter parameters of the jitter canceller based on the measured indication to receive the indication of jitter for each of the plurality of selected filter parameters, and to select filter parameters which produce the least indicated jitter.

2. The apparatus of claim 1, wherein the jitter canceller is a continuous time linear filter.

3. The apparatus of claim 1, wherein the optical signal is a binary single frequency signal.

4. The apparatus of claim 1, wherein the jitter analyzer measures an eye opening of the received electrical signal.

5. The apparatus of claim 1, wherein the jitter analyzer compares the bit-period of the received electrical signal to an optimal bit-period.

6. The apparatus of claim 1, wherein the selected filter parameters comprise a position of a zero of the filter.

7. The apparatus of claim 1, wherein the selected filter parameters comprise a pole of the filter.

8. The apparatus of claim 1, wherein the jitter canceller is coupled between the optical receiver and the electrical receiver to cancel jitter in the received electrical signal.

9. The apparatus of claim 1, wherein the jitter canceller is coupled to an optical transmitter that sends the optical signal to the limiting optical receiver.

10. The apparatus of claim 8, further comprising a jitter metric computer coupled to the received electrical signal and wherein the jitter metric computer is coupled to the jitter canceller through a back channel 11. The apparatus of claim 1, wherein the jitter canceller is integrated into the optical receiver.

12. The apparatus of claim 1, wherein the jitter canceller is integrated into the electrical receiver.

13. A method comprising:
    receiving an amplitude limited electrical signal that has been converted from an optical signal;
    applying a filter to the received electrical signal;
    measuring an indication of jitter of the filtered signal; and
    selecting parameters of the linear filter based on the measured indication, wherein selecting parameters comprises applying a plurality of different parameters to the filter, measuring the indication of jitter for each applied parameter and selecting parameters based on the measurements.

14. The method of claim 13, wherein applying a filter comprises applying a filter to the optical signal before receiving the amplitude limited electrical signal.

15. The method of claim 13, wherein applying a filter comprises countering the measured jitter in the received electrical signal.

16. The method of claim 13, wherein adjusting parameters comprises selecting a combination of passive resistors and capacitors and inductors of the filter.

17. The method of claim 13, wherein adjusting parameters comprises changing a time position of a linear filter.

* * * * *